United States Patent
Scherzer et al.

(10) Patent No.: US 6,538,052 B2
(45) Date of Patent: Mar. 25, 2003

(54) CURABLE COMPOSITIONS OF GLYCIDYL COMPOUNDS, AMINIC HARDENERS AND NOVEL LOW VISCOSITY CURING ACCELERATORS

(75) Inventors: Wolfgang Scherzer, Bergkamen (DE); Jörg Volle, Selm/Bork (DE)

(73) Assignee: Vantico GmbH & Co., Bergkamen (DE)

( * ) Notice: Subject to any disclaimer, the term of this patent is extended or adjusted under 35 U.S.C. 154(b) by 0 days.

(21) Appl. No.: 09/894,341

(22) Filed: Jun. 28, 2001

(65) Prior Publication Data

US 2002/0019463 A1 Feb. 14, 2002

(30) Foreign Application Priority Data

Jul. 3, 2000 (DE) .......................... 100 32 261

(51) Int. Cl.$^7$ ............................ C08K 5/06; C08L 63/02
(52) U.S. Cl. ................... 523/456; 523/466; 528/93; 528/124
(58) Field of Search ................ 523/466, 456; 528/93, 124

(56) References Cited

U.S. PATENT DOCUMENTS

| | | | |
|---|---|---|---|
| 4,195,152 A | | 3/1980 | Floyd |
| 4,757,144 A | | 7/1988 | Okabe et al. |
| 4,980,412 A | | 12/1990 | Blum |
| 5,032,629 A | | 7/1991 | Hansen et al. |
| 5,578,685 A | | 11/1996 | Neumann et al. |
| 5,688,876 A | | 11/1997 | Ando et al. |
| 5,783,644 A | | 7/1998 | Ando et al. |
| 5,880,228 A | | 3/1999 | Marten |
| 6,057,389 A | * | 5/2000 | Hayes .................. 523/466 |
| 6,355,763 B1 | * | 3/2002 | Scherzer .................. 528/94 |

FOREIGN PATENT DOCUMENTS

| | | |
|---|---|---|
| DE | 1850817 A1 | 5/2000 |
| EP | 0 498 505 B1 | 10/1996 |
| EP | 0 872 505 A1 | 10/1998 |
| NL | 7607553 A | 1/1978 |

OTHER PUBLICATIONS

WPI Accession No. 1990–062443[50] for JP 2014271 (1990).

* cited by examiner

Primary Examiner—Robert Dawson
Assistant Examiner—D. Aylward
(74) Attorney, Agent, or Firm—Proskauer Rose LLP; Kristin Neuman Esq.

(57) ABSTRACT

The invention relates to curable compositions comprising a) an epoxy resin, b) an aminic curing agent and c) a curing accelerator, which comprise as curing accelerator c) at least one or more than one compound selected from c1) a compound of formula (I)

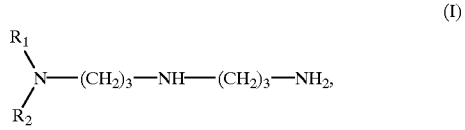

(I)

wherein $R_1$ and $R_2$ are each independently of the other a hydrocarbon radical having from 1 to 12 carbon atoms, c2) a reaction product of a compound of formula (I) with formaldehyde, and c3) a reaction product of a compound of formula (I) with formaldehyde and a phenolic compound, in an amount of from 0.1 to 25% by weight, based on the sum of components a), b) and c), and to a process for the production of cured products using those compositions.

14 Claims, No Drawings

CURABLE COMPOSITIONS OF GLYCIDYL COMPOUNDS, AMINIC HARDENERS AND NOVEL LOW VISCOSITY CURING ACCELERATORS

The invention relates to curable compositions of glycidyl compounds and aminic curing agents, which comprise as curing accelerators dialkyldipropylenetriamines and/or reaction products thereof with formaldehyde and/or phenolic compounds.

Curable compositions based on glycidyl compounds and aminic curing agents are widely used in industry for coating and improving the quality of metallic and mineral surfaces.

As amines there are used especially aliphatic, cycloaliphatic, aromatic or araliphatic compounds and also optionally imidazolidine-group-containing polyaminoamides based on mono- or poly-basic acids and also adducts thereof with epoxy resins.

Such compounds are described in Lee & Neville, Handbook of Epoxy Resins, 1967, Chapter 6/1 to 10/19.

Although the curable compositions based on epoxy resins and those amine compounds generally have a sufficiently long pot life, their curing rate after application to the various substrates is too low for many areas of application.

Furthermore, the viscosity of many compounds, especially of the higher epoxy resin adducts and of the polyaminoamides or their adducts, is relatively high, especially in the range of low temperatures below 20° C.

The curing rate can be accelerated by the addition of suitable curing accelerators.

For that purpose, in most cases there are used Mannich bases of tertiary amines, e.g. tris(dimethylaminomethyl)phenol (DMP30).

Those compounds have the disadvantage, however, that on account of their relatively high viscosity, which has little viscosity-reducing effect on the curing agent, they cannot be used in many applications.

The aim of the present invention was therefore to provide curing accelerators that, by virtue of their own low viscosity, have a strongly viscosity-reducing effect on the curing agent and thus on the curable composition, while physical and mechanical properties are to remain of a high standard.

It has been found, surprisingly, that the above problem can be solved in the case of curable compositions based on epoxy resins and customary amine hardeners that comprise as curing accelerators dialkyldipropylenetriamines and/or reaction products thereof with formaldehyde and/or in the form of Mannich bases.

The invention therefore relates to curable compositions comprising a) an epoxy resin, b) an aminic curing agent and c) a curing accelerator, which comprise as curing accelerator c) at least one or more than one compound selected from c1) a compound of formula (I)

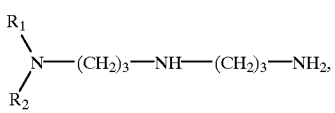

(I)

wherein $R_1$ and $R_2$ are each independently of the other a hydrocarbon radical having from 1 to 12 carbon atoms, c2) a reaction product of a compound of formula (I) with formaldehyde, and c3) a reaction product of a compound of formula (I) with formaldehyde and a phenolic compound, in an amount of from 0.1 to 25% by weight, based on the sum of components a), b) and c).

The compounds of formula (I) are usually prepared by cyanoethylation of dialkylaminopropylamines in a molar ratio of dialkylaminopropylamine to acrylonitrile of 1:1 and subsequent hydrogenation in accordance with procedures known per se.

It is preferable to use amines in which the radicals $R_1$ and $R_2$ are each independently of the other a hydrocarbon radical having from 1 to 8 carbon atoms, preference being given to amines in which the radicals $R_1$ and $R_2$ are each independently of the other methyl, ethyl, propyl, isopropyl, butyl or isobutyl.

The reaction products of formaldehyde with amines of the general formula (I)

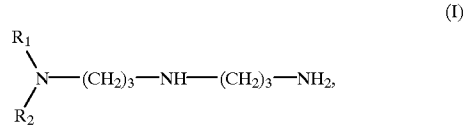

(I)

wherein $R_1$ and $R_2$ are as defined above, which reaction products are used according to the invention in the curable mixtures, yield heterocyclic amines according to formula (II). It is preferable to use a molar ratio of formaldehyde to amine of from 1:1 to 3:2.

The invention therefore relates also to curable compositions comprising a) an epoxy resin, b) an aminic curing agent and c) a curing accelerator, which comprise as curing accelerator c2) a compound of formula (II)

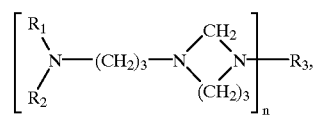

(II)

wherein $R_1$ and $R_2$ are each independently of the other a hydrocarbon radical having from 1 to 12 carbon atoms, $R_3$ is a hydrogen atom when n=1 or $R_3$ is methylene when n=2, obtainable by reaction of a compound of formula (I) with formaldehyde in a molar ratio of from 1:1 to 2:3.

Preparation is generally carried out by adding formaldehyde, preferably paraformaldehyde, in portions to the amine. The reaction proceeds exothermically. The addition of the formaldehyde is therefore controlled in such a manner that the reaction temperature does not exceed about 100° C. According to the invention the operation is preferably carried out at about from 30° C. to 80° C. When all the formaldehyde has been added, the water of reaction formed is removed from the reaction mixture by increasing the temperature to about 130° C., optionally under reduced pressure. The residue that remains behind can be used as curing accelerator without further working-up.

The reaction products of formaldehyde and phenolic compounds with amines of the general formula (I)

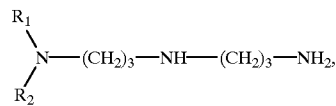

(I)

wherein $R_1$ and $R_2$ are as defined above, which reaction products are used according to the invention in the curable mixtures, are so-called Mannich bases.

Such Mannich bases are obtainable according to procedures known per se. The molar ratios depend upon the degree of substitution desired and the functionality of the phenolic component. For example, the molar ratio for phenol can be varied between 3:1 and 1:1, while the degree of substitution for ortho-cresol is between 2:1 and 1:1 and e.g. for 4,4'-di-hydroxydiphenylmethane is between 4:1 and 1:1. The molar ratio of amine per hydroxyl group of the phenolic compound is preferably from 3:1 to 1:1. The molar ratio of amine to formaldehyde is preferably from equimolar to a slight molar excess of formaldehyde.

The invention therefore relates also to curable compositions comprising a) an epoxy resin, b) an aminic curing agent and c) a curing accelerator, which comprise as curing accelerator c3) a compound obtainable by reaction of a compound of formula (I), formaldehyde and a phenolic compound, the molar ratio of amine per hydroxyl group of the phenolic compound being from 3:1 to 1:1 and of amine to formaldehyde being from 1:1 to 1.0:1.2.

As phenols it is possible to use, for example: monophenols, such as phenol, ortho-, meta- or para-cresol, the xylenol isomers, para-tertiary butylphenol, para-nonylphenol, naphthol and also di- and poly-phenols, such as resorcinol, hydroquinone, 4,4'-dihydroxydiphenyl, 4,4'-dihydroxydiphenyl ether, 4,4'-dihydroxydiphenylsulfone, 4,4'-dihydroxydiphenylmethane (bisphenol F), dihydroxy-diphenylpropane (bisphenol A). Bisphenol A and bisphenol F are preferred. As aldehyde component there may be used any compound that yields formaldehyde under the given reaction conditions, e.g. trioxane or paraformaldehyde.

The curing accelerators c) according to the invention are used in the curable compositions in amounts of from 0.1 to 25% by weight, preferably from 1 to 10% by weight, based on the sum of components a), b) and c).

The epoxy compounds (a) used according to the invention are commercially available products having more than one epoxy group per molecule that are derived from mono- or/and poly-valent, mono- or/and poly-nuclear phenols, especially bisphenols, and also novolaks. A comprehensive list of such di- or poly-phenols can be found in the handbook "Epoxidverbindungen and Epoxidharze" by A. M. Paquin, Springer Verlag, Berlin, 1958, Chapter IV, and Lee & Neville "Handbook of Epoxy Resins", 1967, Chapter 2.

It is also possible to use mixtures of two or more of the epoxy resins. It is preferable to use glycidyl compounds based on bisphenol A (4,4'-dihydroxy-diphenylpropane-2,2) and/or bisphenol F (4,4'-dihydroxy-diphenylmethane) having epoxy values of from 0.4 to 0.62.

It is also possible to use mixtures of epoxy resins with so-called reactive diluents, e.g. monoglycidyl ethers of phenols or mono- or di-functional aliphatic or cycloaliphatic alcohols. Such reactive diluents are used primarily for reducing viscosity and, since they have an unfavourable effect on the final properties of the thermoset, should be used only in small amounts.

The epoxy resins mentioned by way of example can be used both for the curable combinations and for the preparation of the curing agent/epoxide adducts which can likewise be used in the process according to the invention.

The aminic curing agents (b) used according to the invention are aliphatic, cycloaliphatic, araliphatic or aromatic amines, optionally imidazoline-group-containing aminoamides, that preferably contain more than two reactive amine hydrogen atoms per molecule, and also adducts thereof with glycidyl compounds. Such compounds are part of the general prior art and are described, for example, in Lee & Neville, "Handbook of Epoxy Resins", Mc Graw Hill Book Company, 1967, Chapter 6–10.

For coating metallic or mineral substrates it is preferable to use cycloaliphatic amines or polyaminoamides based on mono- or poly-basic carboxylic acids and polyalkylenep-olyamines and also adducts thereof with glycidyl compounds.

Those curing agents are commercially available products and are available, for example, from Ciba GmbH under the trade mark ARADUR®, especially ARADUR (AD) 43, AD 46, AD 350.

The compounds of formula (I) can, on account of the number of reactive amine hydrogen atoms they contain, also be used as hardeners for epoxy resins. Curing agents and epoxy compounds are used in the process according to the invention preferably in approximately equivalent amounts, that is to say based on active amine hydrogen atoms and reactive epoxy groups. It is also possible, however, to use curing agent or glycidyl component in more than or less than the stoichiometric amount. The amounts in question lie in the range of about from 10 to 200% by weight, based on glycidyl compounds, and are governed by the final properties desired in the reaction product. Customary catalytic hardeners for epoxy resins can be used alongside the curing accelerators according to the invention.

The procedure is generally to add the curing accelerators according to the invention and the customary catalytic or reactive hardeners in the desired ratio to the epoxy compound separately or in the form of a mixture.

The mixing ratio of glycidyl compound to the curing accelerators c) used according to the invention is controlled in dependence upon the particular compound used and the final properties desired in the cured end products.

Generally, when liquid glycidyl ethers based on bisphenol A or bisphenol F having epoxy values of from about 0.40 to about 0.62 are used, the accelerator is used in an amount of from 0.1 to 25% by weight, based on the curable mixture; according to the invention an amount of about from 1 to 10% by weight is preferred.

The special advantage of the curable compositions according to the invention lies in their excellent curing behaviour at temperatures of from 10° C. to 25° C. and high relative humidity values of up to about 95%.

Depending upon the field of application and the intended use, there may be added to the compositions of epoxy resin, curing agent and accelerator according to the invention the auxilaries and additives customarily used for curable epoxy resin compositions in the form of inorganic and/or organic additives, such as finely particulate sands, talcum, silicic acid, argillaceous earth, metals or metal compounds in the form of chips or powders, thixotropic agents, fibrous materials, e.g. asbestos and glass staple fibres, pigments, flame retardants, solvents, dyes, plasticisers, bitumen and mineral oils.

The curable compositions according to the invention can be used in the coating of absorbent and non-absorbent substrates, for example natural stone, marble, concrete, metals, glass, and also as adhesives and sealants, and for the production of mouldings.

Analysis methods

Viscosity

Measured using a Haake rotary viscometer RV 20 in accordance with the manufacturer's instructions.

Colour value

Measured in accordance with DIN 53 995 using the Lovibond colour-measuring apparatus (Hazen colour value, APHA).

Amine number

Measured in accordance with DIN 16 945.

Tecam value

Value for the gelation time, measured using a Tecam Gelation Timer GT3 from Techne, Cambridge, GB, at 23° C. and 50% relative humidity. Sample mixture of resin and hardener and accelerator=250 g.

Shore D Hardness

Measured using Type 38009 apparatus from Karl Frank GmbH using test specimens 30 mm in diameter and 6 mm thick after 1, 2 and 3 days.

EXAMPLES

Accelerator 1

158 g (1 mol) of N,N-dimethyldipropylenetriamine (DMDPTA) are introduced into a reaction vessel and heated to about 30° C. With vigorous stirring, 30 g (1 mol) of paraformaldehyde are added in 3 portions of about 10 g in such a manner that the temperature does not exceed 80° C. (exothermic reaction). The reaction mixture is allowed to react for about 30 min until a clear reaction product free of solids is obtained. The reaction product is then heated. From a bottom temperature of about 102° C. the water released begins to distill. The temperature is increased to 130° C. in the course of about 30 min. At 130° C. the reaction mixture is stirred for 30 min and then the pressure is reduced to 1 mbar in order to free the product of residual water and residual free DMDPTA.

The total distillate is about 19 g. The vacuum is then broken with nitrogen and the reaction product is allowed to cool. Product analysis values: amine number: about 980 mg KOH/g; viscosity/25° C.: 7 mPa·s; colour value: 30 (APHA).

Accelerator 2

The following are reacted in accordance with Example 1: 158 g of N,N-dimethyldipropylenetriamine and 45 g of paraformaldehyde. Product analysis values: amine number: about 956 mg KOH/g; viscosity/25° C.: 56 mpa·s; colour value: 35 (APHA).

Accelerator 3

N,N-Dimethyldipropylenetriamine.

Accelerator 4

158 g (1 mol) of N,N-dimethyldipropylenetriamine are introduced into a reaction vessel and heated to about 50° C. 94 g of phenol (1 mol) are added and dissolved. Then 30 g of para-formaldehyde (1 mol) are added, in portions, at from 50° C. to max. 90° C. and dissolved to form a clear solution. The reaction product is then heated to 150° C., the water of reaction formed being distilled off. The distillate is 18 g. Product analysis values: amine number: about 640 mg KOH/g; viscosity/25° C.: 380 mpa·s; colour value: 60 (APHA).

Accelerator 5

The following are reacted in accordance with Example 4: 158 g of N,N-dimethyl-dipropylenetriamine (1 mol); 30 g of paraformaldehyde (1 mol); 31.3 g of phenol (0.33 mol). Product analysis values: amine number: about 835 mg KOH/g; viscosity/25° C.: 25 mPa·s; colour value: 50 (APHA).

Accelerator 6 (Comparison Example)

2,4,6-Tris(dimethylaminomethyl)phenol (DMP 30).

Commercial products are used below:

As hardener: AD 43=modified adduct based on cycloaliphatic amines and glycidyl ethers based on bisphenol A with an amine number of about 270; AD 46=modified adduct based on cycloaliphatic and araliphatic amines and glycidyl ethers based on bisphenol A with an amine number (AN) of about 325; AD 140=polyaminoimidazoline based on dimerised fatty acid with an AN of about 400 and AD 350=polyaminoimidazoline with an AN of about 390. As epoxy resins:

Araldite GY 240=diglycidyl ether based on bisphenol A with an epoxy value of ≈0.54;

Araldite GY 783=modified epoxy resin based on bisphenol A and bisphenol F and aliphatic diluent with an epoxy value of 0.520.

The compositions of 28 Examples are listed in Table 1. The test results obtained with those compositions are listed in Table 2.

The low viscosity of the compounds according to the invention and therefore their strongly viscosity-reducing properties in combination with customary aminic curing agents are the subject of Examples 29 to 36 and Table 3.

TABLE 1

| Example | Accelerator (g) | Hardener (g) | Resin (g) |
|---------|-----------------|--------------|-----------|
| 1  | -(-)   | AD 46 (50)  | GY 783 (100) |
| 2  | 1(5)   | "           | "            |
| 3  | 2(5)   | "           | "            |
| 4  | 3(5)   | "           | "            |
| 5  | 3(3)   | "           | "            |
| 6  | 3(10)  | "           | "            |
| 7  | 6(5)   | "           | "            |
| 8  | -(-)   | AD 43 (60)  | GY 783 (100) |
| 9  | 1(5)   | "           | "            |
| 10 | 2(5)   | "           | "            |
| 11 | 3(5)   | "           | "            |
| 12 | 6(5)   | "           | "            |
| 13 | -(-)   | AD 350 (50) | GY 240 (100) |
| 14 | 1(5)   | "           | "            |
| 15 | 2(5)   | "           | "            |
| 16 | 3(5)   | "           | "            |
| 17 | 6(5)   | "           | "            |
| 18 | -(-)   | AD 140 (50) | GY 240 (100) |
| 19 | 1(5)   | "           | "            |
| 20 | 2(5)   | "           | "            |
| 21 | 3(5)   | "           | "            |
| 22 | 1(3)   | "           | "            |
| 23 | 1(10)  | "           | "            |
| 24 | 6(5)   | "           | "            |
| 25 | 4(5)   | AD 350 (50) | "            |
| 26 | 5(5)   | "           | "            |
| 27 | 4(5)   | "           | GY 783 (100) |
| 28 | 5(5)   | "           | "            |

TABLE 2

| | Curing temp. | Shore D hardness after days | | | Gelation time at 25° C. | Batch |
|---|---|---|---|---|---|---|
| Example | [° C.] | 1d | 2d | 3d | [min] | [g] |
| 1  | 10 | 49 | 69 | 72 | 63  | 150 |
| 2  | "  | 62 | 74 | 76 | 57  | 150 |
| 3  | "  | 56 | 73 | 76 | 65  | 150 |
| 4  | "  | 67 | 75 | 78 | 55  | 150 |
| 5  | "  | 58 | 74 | 75 | 60  | 150 |
| 6  | "  | 70 | 75 | 78 | 40  | 150 |
| 7  | "  | 67 | 75 | 78 | 50  | 150 |
| 8  | "  | 14 | 54 | 66 | 73  | 150 |
| 9  | "  | 41 | 68 | 74 | 53  | 150 |
| 10 | "  | 33 | 67 | 73 | 65  | 150 |
| 11 | "  | 54 | 71 | 74 | 52  | 150 |
| 12 | "  | 56 | 71 | 74 | 48  | 150 |
| 13 | 25 | 26 | 68 | 75 | 158 | 150 |
| 14 | "  | 71 | 75 | 77 | 130 | 150 |
| 15 | "  | 63 | 75 | 78 | 139 | 150 |
| 16 | "  | 70 | 75 | 77 | 115 | 150 |

TABLE 2-continued

| Example | Curing temp. [° C.] | Shore D hardness after days | | | Gelation time at 25° C. [min] | Batch [g] |
|---|---|---|---|---|---|---|
| | | 1d | 2d | 3d | | |
| 17 | " | 71 | 75 | 78 | 131 | 150 |
| 18 | " | 58 | 65 | 65 | 152 | 250 |
| 19 | " | 65 | 70 | 70 | 95 | 250 |
| 20 | " | 72 | 75 | 75 | 123 | 250 |
| 21 | " | 70 | 71 | 74 | 85 | 250 |
| 22 | " | 65 | 70 | 70 | 120 | 250 |
| 23 | " | 70 | 72 | 75 | 70 | 250 |
| 24 | " | 71 | 71 | 72 | 100 | 250 |
| 25 | " | 69 | 78 | 80 | 250 | 100 |
| 26 | " | 68 | 77 | 80 | 270 | 100 |
| 27 | " | 15 | 57 | 68 | 440 | 100 |
| 28 | " | 17 | 58 | 74 | 440 | 100 |

TABLE 3

| | Product | Viscosity at 25° C. in m.Pa.s |
|---|---|---|
| Example 29 | Aradur 140 without accelerator | 15 800 |
| Example 30 | Aradur 140 (100 g) + accelerator 1 (5 g) | 8 400 |
| Example 31 | Aradur 140 (100 g) + accelerator 2 (5 g) | 12 000 |
| Example 32 | Aradur 140 (100 g) + accelerator 3 (5 g) | 8 700 |
| Example 33 | Aradur 140 (100 g) + accelerator 3 (10 g) | 5 050 |
| Example 34 | Aradur 140 (100 g) + accelerator 4 (5 g) | 12 500 |
| Example 35 | Aradur 140 (100 g) + accelerator 5 (10 g) | 8 500 |
| Example 36 | Aradur 140 (100 g) + accelerator 6 (5 g) | 14 100 |

As can be seen from Table 3, the viscosity of the hardener Aradur 140 accelerated in accordance with the prior art in Comparison Example 6 is appreciably greater than the viscosities of the hardener Aradur 140 accelerated using the compounds according to the invention. It will also be seen from Table 2 that, surprisingly, the hardeners accelerated using the compounds according to the invention (especially accelerators 1 and 2) have appreciably longer gelation times while having a comparable curing rate (measured in accordance with Shore D). This is a great advantage in practice, since the processing time is significantly longer, while the curing rate remains virtually unchanged.

What is claimed is:

1. A curable composition comprising a) an epoxy resin, b) an aminic curing agent and c) a curing accelerator, which comprises as curing accelerator c) at least one or more than one compound selected from
c1) a compound of formula (I)

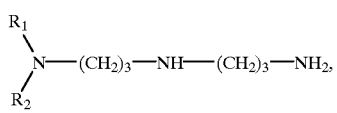

(I)

wherein $R_1$ and $R_2$ are each independently of the other a hydrocarbon radical having from 1 to 12 carbon atoms,
c2) a reaction product of a compound of formula (I) with formaldehyde, and
c3) a reaction product of a compound of formula (I) with formaldehyde and a phenolic compound, in an amount of from 0.1 to 25% by weight, based on the sum of components a), b) and C).

2. A curable composition according to claim 1, which comprises as curing accelerator c2) a compound of formula (II)

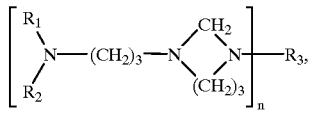

(II)

wherein $R_1$ and $R_2$ are are each independently of the other a hydrocarbon radical having from 1 to 12 carbon atoms, $R_3$ is a hydrogen atom when n=1 or $R_3$ is methylene when n=2, obtainable by reaction of a compound of formula (I) with formaldehyde in a molar ratio of from 1:1 to 2:3.

3. A curable composition according to claim 1, which comprises as curing accelerator c3) a compound obtainable by reaction of a compound of formula (I), formaldehyde and a phenolic compound, the molar ratio of amine per hydroxyl group of the phenolic compound being from 3:1 to 1:1 and of amine to formaldehyde being from 1:1 to 1:1.2.

4. A curable composition according to claim 1, wherein R1 and R2 are each independently of the other a hydrocarbon radical having from 1 to 8 carbon atoms.

5. A curable composition according to claim 4, wherein $R_1$ and $R_2$ are each independently of the other methyl, ethyl, propyl, isopropyl, butyl or isobutyl.

6. A curable composition according to claim 1, wherein component a) is an epoxy compound having on average more than one epoxy group in the molecule.

7. A curable composition according to claim 1, which comprises as component b) an aminic curing agent having on average more than two reactive amine hydrogen atoms per molecule.

8. A curable composition according to claim 1, which comprises modifying agents, such as diluents, and/or further auxiliaries and additives customarily used for curable epoxy resin compositions.

9. A process for the production of cured products, wherein a composition according to any one of claims 1 to 8 is used for curing.

10. A curable composition comprising
a) an epoxy resin;
b) an aminic curing agent; and
c) a curing accelerator, which comprises at least one compound selected from the group consisting of:
(i) a compound of formula (I), wherein $R_1$ and $R_2$ are each independently of the other a hydrocarbon radical having from 1 to 12 carbon atoms,
(ii) a reaction product of a compound of formula (I) with formaldehyde; and
(iii) a reaction product of a compound of formula (I) with formaldehyde and a phenolic compound, in an amount of from 0.1 to 25% by weight, based on the sum of components a), b) and c);
said composition having a hardness after curing for one day at 10° C. that is at least about 10% higher than the hardness after curing for one day at 10° C. of the same curable composition without element c).

11. A curable composition according to claim 10, wherein the hardness after curing for one day at 10° C. is at least about 35% higher than the hardness after curing for one day at 10° C. of the same curable composition without element c).

12. A curable composition according to claim 11, wherein the hardness after curing for one day at 10° C. is at least about 100% higher than the hardness after curing for one day at 10° C. of the same curable composition without element c).

13. A curable composition according to claim 10, comprising element c) in an amount of at least about 3% by weight, based on the sum of components a), b) and c).

14. A curable composition according to claim 10, wherein the epoxy resin is a glycidyl compound based on a member selected from the group consisting of bisphenol A and bisphenol F having epoxy values of from about 0.40 to about 0.62.

* * * * *